(12) United States Patent
Sugano et al.

(10) Patent No.: US 11,647,141 B2
(45) Date of Patent: May 9, 2023

(54) IMAGE READING DEVICE AND IMAGE READING METHOD

(71) Applicant: Mitsubishi Electric Corporation, Tokyo (JP)

(72) Inventors: Miki Sugano, Tokyo (JP); Masako Asamura, Tokyo (JP); Kohei Kurihara, Tokyo (JP); Kosaku Yamagata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/790,513

(22) PCT Filed: Jan. 31, 2020

(86) PCT No.: PCT/JP2020/003612
§ 371 (c)(1),
(2) Date: Jul. 1, 2022

(87) PCT Pub. No.: WO2021/152813
PCT Pub. Date: Aug. 5, 2021

(65) Prior Publication Data
US 2023/0034290 A1    Feb. 2, 2023

(51) Int. Cl.
*H04N 1/40* (2006.01)
*H04N 1/028* (2006.01)
(Continued)

(52) U.S. Cl.
CPC ..... *H04N 1/02805* (2013.01); *H04N 1/00816* (2013.01); *H04N 1/3872* (2013.01)

(58) Field of Classification Search
None
See application file for complete search history.

(56) References Cited

U.S. PATENT DOCUMENTS

| 5,859,712 | A | 1/1999 | Kim |
| 10,616,442 | B2 * | 4/2020 | Takizawa ............... H04N 1/192 |

(Continued)

FOREIGN PATENT DOCUMENTS

| JP | 62-66760 A | 3/1987 |
| JP | 9-247386 A | 9/1997 |

(Continued)

OTHER PUBLICATIONS

International Search Report and Written Opinion dated Mar. 17, 2020, received for PCT Application PCT/JP2020/003612, filed on Jan. 31, 2020, 10 pages including English Translation.

(Continued)

*Primary Examiner* — Dung D Tran
(74) *Attorney, Agent, or Firm* — Xsensus LLP

(57) ABSTRACT

There are provided a line sensor (110) including two first sensor pixel rows (111a, 111b) and a second sensor pixel row (112a); an image obtaining unit (140) to obtain, from electrical signals obtained by scanning an original in a sub-scanning direction with the two first sensor pixel rows (111a, 111b), two first read image data items, and obtain, from electrical signals obtained by scanning the original in the sub-scanning direction with the second sensor pixel row (112a), a second read image data item; and an image processor (150) to incorporate one or more pixel data items of one or more pixels included in an interval between the two first sensor pixel rows (111a, 111b) out of the second read image data item into the two first read image data items, thereby generating a line image data item in which the one or more pixels in the interval are not vacant.

3 Claims, 11 Drawing Sheets

(51) Int. Cl.
*H04N 1/00* (2006.01)
*H04N 1/387* (2006.01)

(56) References Cited

U.S. PATENT DOCUMENTS

| | | | |
|---|---|---|---|
| 2006/0050951 A1* | 3/2006 | Iwasaki | H04N 1/1903 |
| | | | 382/151 |
| 2009/0128854 A1* | 5/2009 | Takei | H04N 1/1912 |
| | | | 358/1.15 |
| 2011/0026085 A1* | 2/2011 | Tsukahara | H04N 1/193 |
| | | | 358/482 |
| 2018/0007232 A1* | 1/2018 | Yamagata | H04N 1/387 |
| 2018/0213117 A1* | 7/2018 | Momose | H04N 1/3876 |
| 2018/0249035 A1 | 8/2018 | Fujiuchi et al. | |

FOREIGN PATENT DOCUMENTS

| | | |
|---|---|---|
| JP | 2003-101724 A | 4/2003 |
| JP | 2006-217641 A | 8/2006 |
| JP | 2008-22062 A | 1/2008 |
| JP | 2011-23789 A | 2/2011 |
| JP | 2015-226127 A | 12/2015 |
| JP | 2018-121101 A | 8/2018 |
| WO | 2017/104756 A1 | 6/2017 |

OTHER PUBLICATIONS

Notice of Reasons for Refusal dated Sep. 29, 2020, received for JP Application 2020-536704, 16 pages including English Translation.

\* cited by examiner

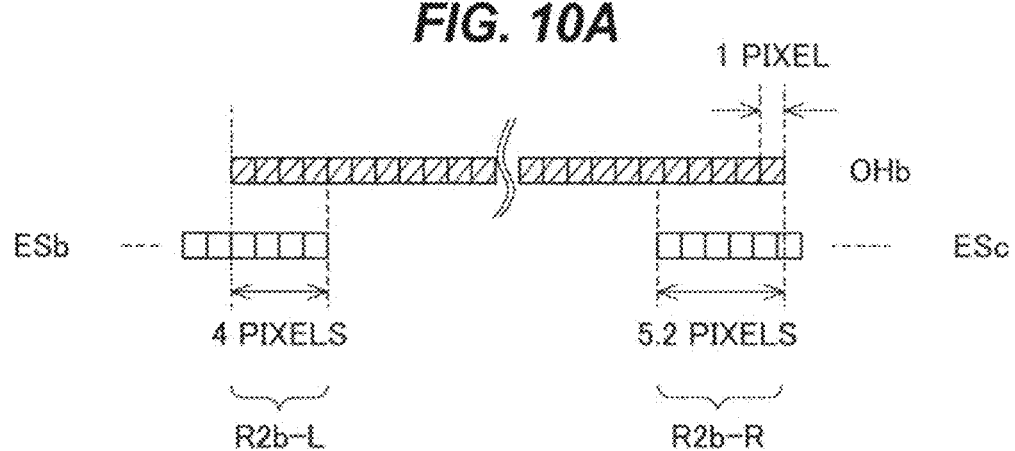
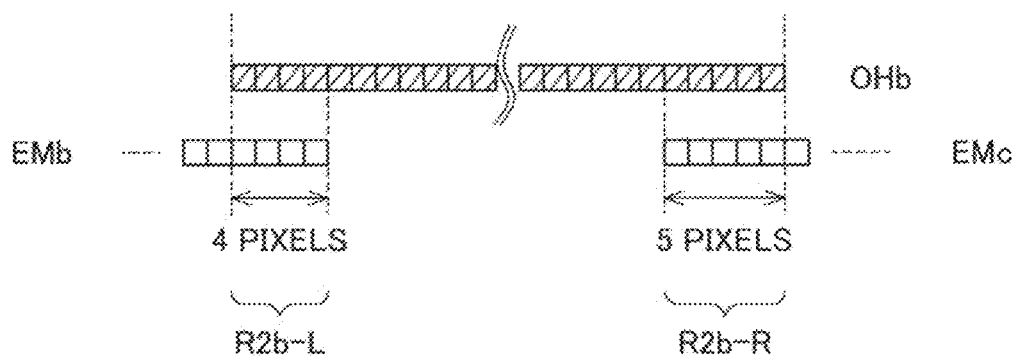

IMAGE READING DEVICE AND IMAGE READING METHOD

CROSS-REFERENCE TO RELATED APPLICATION

The present application is based on PCT filing PCT/JP2020/003612, filed Jan. 31, 2020, the entire contents of which are incorporated herein by reference.

TECHNICAL FIELD

The present disclosure relates to an image reading device and an image reading method.

BACKGROUND ART

Contact image sensors that scan originals as subjects of image reading applied to copiers, scanners, facsimile machines, or the like with line sensors that are one-dimensional imaging devices and generate image data representing images of the originals have been put to practical use.

A contact image sensor includes multiple sensor pixel rows arranged linearly in a main scanning direction. Each of the multiple sensor pixel rows includes multiple imaging elements arranged linearly in the main scanning direction at predetermined intervals. Each of the multiple imaging elements corresponds to pixel data indicating a value of one pixel on a one-to-one basis.

No imaging elements are disposed between adjacent two of the multiple sensor pixel rows. Thus, when the imaging elements are arranged with a small pitch, a lack of pixel data occurs at a boundary between the two sensor pixel rows.

Thus, for example, Patent Literature 1 discloses a device that interpolates lacking pixel data from neighboring pixel data by signal processing.

CITATION LIST

Patent Literature

Patent Literature 1: Japanese Patent Application Publication No. 2003-101724 (page 8 and FIG. 3)

SUMMARY OF INVENTION

Technical Problem

However, in the conventional device, when the sensor pixel rows have a high resolution, the number of pixels corresponding to a lacking portion is more than one, and the interpolation cannot be performed with high accuracy.

Thus, an object of the present disclosure is to make it possible to accurately read an image of an original even in the case of using high-resolution sensor pixel rows.

Solution to Problem

An image reading device according to an aspect of the present disclosure includes: a line sensor including at least one set including two first imaging element rows and a second imaging element row, the two first imaging element rows each including a plurality of imaging elements that are arranged in a main scanning direction and obtain electrical signals of pixels in the main scanning direction, the two first imaging element rows being arranged with a first interval therebetween in the main scanning direction, the second imaging element row including a plurality of imaging elements that are arranged in the main scanning direction and at least obtain one or more electrical signals of one or more pixels included in the first interval, the two first imaging element rows and the second imaging element row being arranged with a predetermined second interval therebetween in a sub-scanning direction that is a direction perpendicular to the main scanning direction; an image obtaining unit to obtain, from electrical signals obtained by scanning an original in the sub-scanning direction with the two first imaging element rows, two first read image data items including pixel data items of pixels corresponding to the respective two first imaging element rows, and obtain, from electrical signals obtained by scanning the original in the sub-scanning direction with the second imaging element row, a second read image data item including pixel data items of pixels corresponding to the second imaging element row; and an image processor to generate a line image data item in which the one or more pixels in the first interval are not vacant, by incorporating one or more pixel data items of the one or more pixels included in the first interval out of the second read image data item into the two first read image data items.

An image reading method according to an aspect of the present disclosure includes: obtaining two first read image data items from electrical signals obtained by scanning an original with two first imaging element rows in the sub-scanning direction, the two first imaging element rows each including a plurality of imaging elements that are arranged in a main scanning direction and obtain electrical signals of pixels in the main scanning direction, the two first imaging element rows being arranged with a first interval therebetween in the main scanning direction, the two first read image data items including pixel data items of pixels corresponding to the respective two first imaging element rows; obtaining a second read image data item from electrical signals obtained by scanning the original with a second imaging element row in the sub-scanning direction, the second imaging element row including a plurality of imaging elements that are arranged in the main scanning direction and at least obtain one or more electrical signals of one or more pixels included in the first interval, the second read image data item including pixel data items of pixels corresponding to the second imaging element row; and generating a line image data item in which the one or more pixels in the first interval are not vacant, by incorporating one or more pixel data items of the one or more pixels included in the first interval out of the second read image data item into the two first read image data items.

Advantageous Effects of Invention

One or more aspects of the present disclosure make it possible to accurately read an image of an original even in the case of using high-resolution sensor pixel rows.

BRIEF DESCRIPTION OF DRAWINGS

FIGS. 10A and 10B are schematic diagrams for explaining a process of correcting displacements in the main scanning direction in a main scanning direction position corrector.

DESCRIPTION OF EMBODIMENTS

First Embodiment

Figure 1:
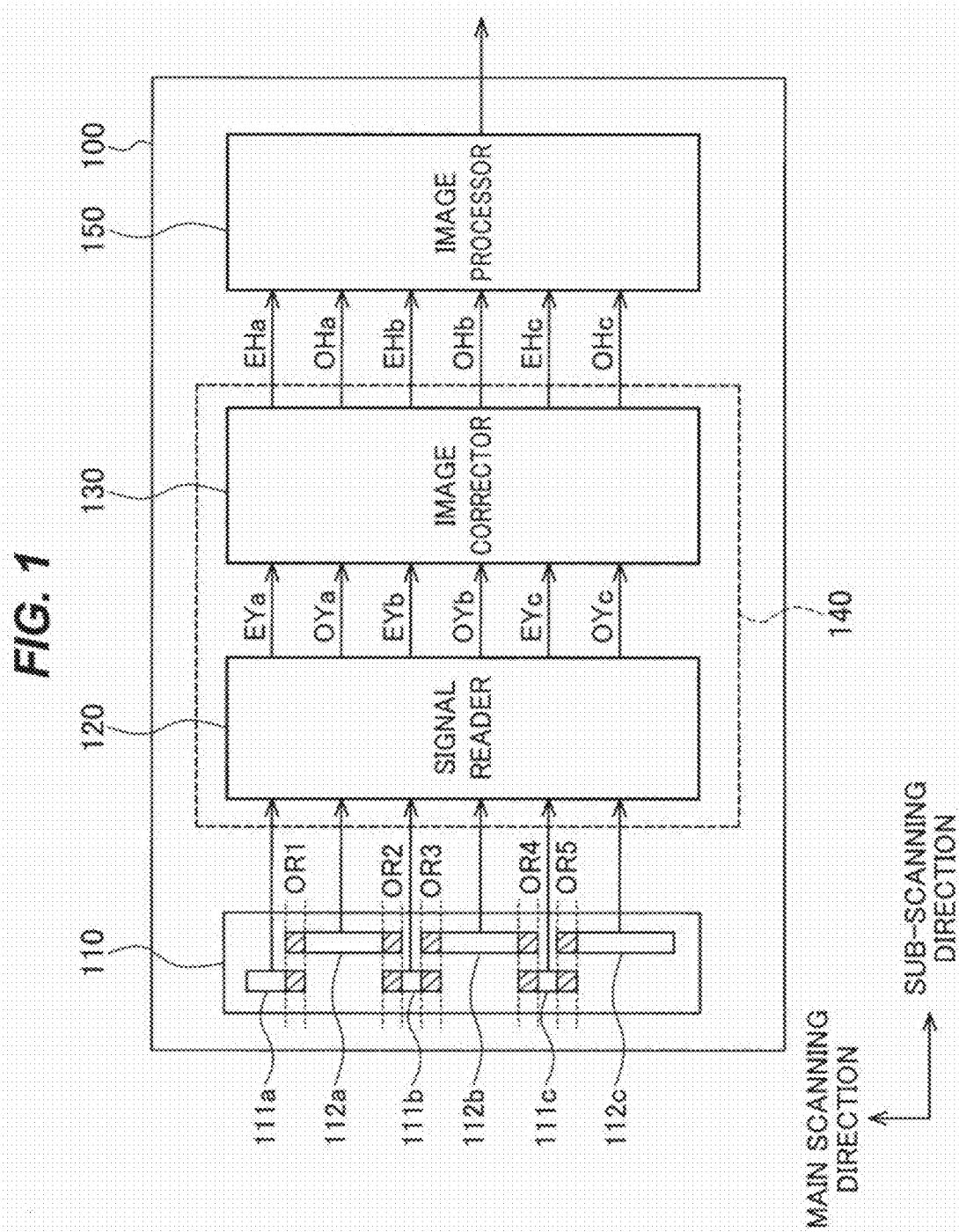
FIG. 1 is a block diagram illustrating a configuration of a main portion of an image reading device according to a first embodiment.

FIG. 1 is a block diagram illustrating a configuration of a main portion of an image reading device 100 according to a first embodiment.

The main portion of the image reading device 100 according to the first embodiment includes a line sensor 110, a signal reader 120, an image corrector 130, and an image processor 150. Although not illustrated in FIG. 1, the image reading device 100 may include other portions, such as a light source that illuminates an original to be read, a conveyor that conveys the original or line sensor 110, and a controller that controls operation of the entire device. In the first embodiment, it is assumed that the conveyor conveys the original.

The line sensor 110 includes imaging elements that convert light reflected from the original into electrical signals. Electrical signals of pixels are obtained by the imaging elements.

The line sensor 110 includes first sensor pixel rows 111a to 111c that are first imaging element rows including multiple imaging elements arranged in a main scanning direction, and second sensor pixel rows 112a to 112c that are second imaging element rows including multiple imaging elements arranged in the main scanning direction.

In the first embodiment, each of the first sensor pixel rows 111a to 111c is formed by a first sensor chip that is a single sensor chip. Also, each of the second sensor pixel rows 112a to 112c is formed by a second sensor chip that is a single sensor chip.

A first interval that is a predetermined interval exists between the first sensor pixel row 111a and the first sensor pixel row 111b, and between the first sensor pixel row 111b and the first sensor pixel row 111c. The first interval is an interval greater than or equal to one pixel.

In the line sensor 110, the second sensor pixel rows 112a to 112c are disposed at positions spaced by one or more lines from the first sensor pixel rows 111a to 111c in a sub-scanning direction perpendicular to the main scanning direction. The interval between the first sensor pixel rows 111a to 111c and the second sensor pixel rows 112a to 112c will also be referred to as a second interval.

Also, the first sensor pixel rows 111a to 111c and second sensor pixel rows 112a to 112c are arranged so that at their ends in the main scanning direction, regions OR1 to OR5 including one or more pixels overlap each other in the main scanning direction.

That is, the second sensor pixel row 112a is configured so that it can at least obtain electrical signal(s) of pixel(s) included in the interval between the first sensor pixel row 111a and the first sensor pixel row 111b, and the second sensor pixel row 112b is configured so that it can at least obtain electrical signal(s) of pixel(s) included in the interval between the first sensor pixel row 111b and the first sensor pixel row 111c.

Moreover, the second sensor pixel row 112a includes imaging elements also outside the interval between the first sensor pixel row 111a and the first sensor pixel row 111b in the main scanning direction so that it can obtain electrical signals of pixels outside both ends of the interval in the main scanning direction. The second sensor pixel row 112b includes imaging elements also outside the interval between the first sensor pixel row 111b and the first sensor pixel row 111c in the main scanning direction so that it can obtain electrical signals of pixels outside both ends of the interval in the main scanning direction.

The first sensor pixel rows 111a to 111c are equal in number of pixels per one sensor pixel row, and the second sensor pixel rows 112a to 112c are also equal in number of pixels per one sensor pixel row. Pixel intervals that are intervals in the main scanning direction between pixels of each of the first sensor pixel rows 111a to 111c and each of the second sensor pixel rows 112a to 112c are equal.

In this embodiment, the number of pixels per one sensor pixel row of the first sensor pixel rows 111a to 111c is less than that of the second sensor pixel rows 112a to 112c. The number of pixels per one sensor pixel row of the second sensor pixel rows 112a to 112c may be less than that of the first sensor pixel rows 111a to 111c, or they may be equal.

When the original is conveyed, the first sensor pixel rows 111a to 111c start to read the original earlier, and the second sensor pixel rows 112a to 112c read image data of the original the time required to convey the original later. That is, the first sensor pixel rows 111a to 111c are disposed upstream of the second sensor pixel rows 112a to 112c in the sub-scanning direction. Although in FIG. 1, the line sensor 110 is constituted by six sensor pixel rows, it is sufficient that the line sensor 110 include three or more sensor pixel rows arranged at different sub-scanning positions, e.g., at least one set including two first sensor pixel rows and one second sensor pixel row.

The signal reader 120 converts values corresponding to the electrical signals obtained by the line sensor 110 into image data indicating them on a pixel-by-pixel basis.

The image corrector 130 corrects image data input thereto for variation in performance between the sensor pixel rows or the like, and outputs characteristic corrected image data that is image data resulting from the correction, as read image data.

As above, the signal reader 120 and image corrector 130 constitute an image obtaining unit 140 that obtains, from the electrical signals obtained by the line sensor 110, the read image data indicating a value of each pixel.

For example, the electrical signals detected by the first sensor pixel rows 111a to 111c and second sensor pixel rows 112a to 112c are read by the signal reader 120, and converted into first image data items EYa to EYc and second image data items OYa to OYc. The first image data items EYa to EYc and second image data items OYa to OYc are corrected by the image corrector 130, and the corrected image data items are output as first read image data items EHa to EHc and second read image data items OHa to OHc.

That is, the image obtaining unit 140 obtains, from the electrical signals obtained by scanning the original in the sub-scanning direction with the first sensor pixel rows 111a to 111c, the first read image data items EHa to EHc including pixel data items of corresponding pixels of the first sensor pixel rows 111a to 111c. Also, the image obtaining unit 140 obtains, from the electrical signals obtained by scanning the original in the sub-scanning direction with the second sensor pixel rows 112a to 112c, the second read image data items OHa to OHc including corresponding pixel data items of the second sensor pixel rows 112a to 112c.

The image processor 150 processes the first read image data items EHa to EHc and second read image data items OHa to OHc provided from the image corrector 130.

For example, the image processor 150 inserts the pixel data items of the pixels included in the first intervals, in which the first sensor pixel rows 111a to 111c are not disposed, out of the second read image data items OHa to OHc, into corresponding spaces between the first read image data items EHa to EHc, thereby generating a line image data item in which the pixels in the first intervals are not vacant.

Specifically, the image processor 150 corrects a positional displacement in the sub-scanning direction in the first read image data items EHa to EHc and second read image data items OHa to OHc, generates image data of an image without image overlap in the main scanning direction, and outputs line-by-line line image data representing an image read from the original.

Figure 2:
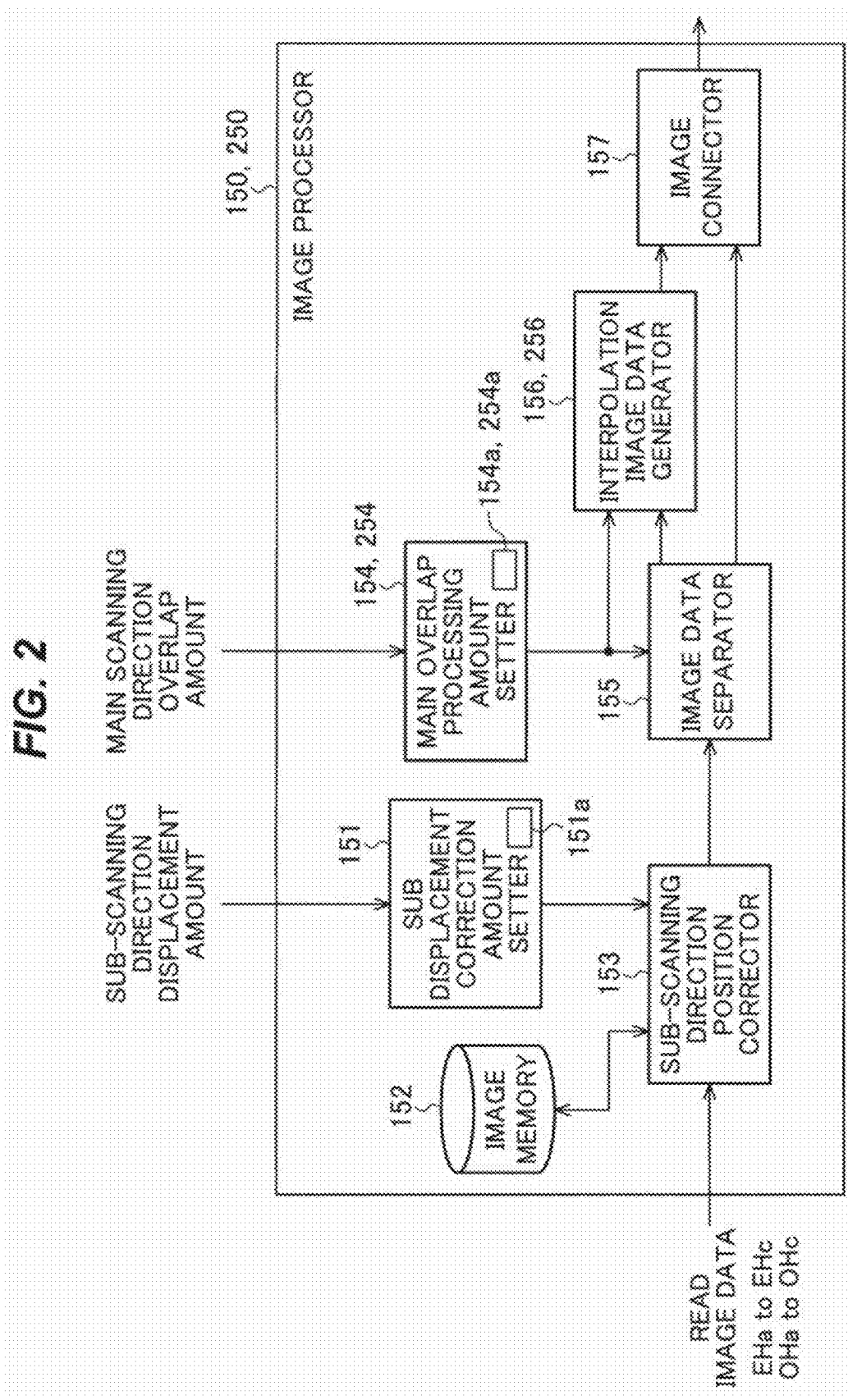
FIG. 2 is a block diagram illustrating configurations of image processors of first and second embodiments.

FIG. 2 is a block diagram illustrating a configuration of the image processor 150.

The image processor 150 includes a sub displacement correction amount setter 151, an image memory 152, a sub-scanning direction position corrector 153, a main overlap processing amount setter 154, an image data separator 155, an interpolation image data generator 156, and an image connector 157.

The sub displacement correction amount setter 151 receives input of sub-scanning direction displacement amount information indicating the positional difference in the sub-scanning direction between the first sensor pixel rows 111a to 111c and the second sensor pixel rows 112a to 112c of the line sensor 110, and stores the sub-scanning direction displacement amount information in a memory 151a that is a sub displacement amount storage.

The sub-scanning direction displacement amount information indicates a sub-scanning direction displacement amount that is a displacement amount in the sub-scanning direction between each pair overlapping each other in the main scanning direction in the first sensor pixel rows 111a to 111c and second sensor pixel rows 112a to 112c.

For example, in the example illustrated in FIG. 1, the sub-scanning direction displacement amount information indicates a sub-scanning direction displacement amount between the pair of the first sensor pixel row 111a and second sensor pixel row 112a, a sub-scanning direction displacement amount between the pair of first sensor pixel row 111b and second sensor pixel row 112a, a sub-scanning direction displacement amount between the pair of the first sensor pixel row 111b and second sensor pixel row 112b, a sub-scanning direction displacement amount between the pair of the first sensor pixel row 111c and second sensor pixel row 112b, and a sub-scanning direction displacement amount between the pair of the first sensor pixel row 111c and second sensor pixel row 112c.

Then, the sub displacement correction amount setter 151 selects, from among the sub-scanning direction displacement amounts indicated by the sub-scanning direction displacement amount information, sub-scanning direction displacement amount(s) corresponding to each of the first read image data items EHa to EHc processed by the sub-scanning direction position corrector 153. Then, the sub displacement correction amount setter 151 calculates sub-scanning direction displacement correction amounts obtained by correcting the selected sub-scanning direction displacement amounts in accordance with the conveyance speed of the original, and provides the sub-scanning direction displacement correction amounts to the sub-scanning direction position corrector 153.

When the sub-scanning direction displacement amounts indicated by the sub-scanning direction displacement amount information are the sub-scanning direction displacement correction amounts, the sub displacement correction amount setter 151 may provide, as the sub-scanning direction displacement correction amounts, the selected sub-scanning direction displacement amounts to the sub-scanning direction position corrector 153.

Measurements of the sub-scanning direction displacement amounts may be performed inside the image reading device 100, or may be performed outside the image reading device 100. When the sub-scanning direction displacement amounts are measured inside the image reading device 100, the measurements may be performed by a portion, e.g., a sub-scanning direction displacement amount measurement unit, that is not illustrated in FIG. 1.

Here, the sub-scanning direction displacement amounts include, in addition to displacement amounts due to designed positional displacements between the first sensor pixel rows 111a to 111c and the second sensor pixel rows 112a to 112c, displacement amounts due to mounting displacement occurring during the actual mounting to a substrate or the like. The sub-scanning direction displacement amounts vary depending on the position where the correction is performed, and can be in decimal fraction units, which are finer than integer units that are pixel units. Also, although the first sensor pixel rows 111a to 111c and second sensor pixel rows 112a to 112c are preferably arranged parallel to each other, they are not parallel when mounting displacement occurs, and the sub-scanning direction displacement amount may be different between one end and the other end.

The sub displacement correction amount setter 151 calculates the sub-scanning direction displacement correction amounts depending on a correction method in the sub-scanning direction position corrector 153, and provides them to the sub-scanning direction position corrector 153. For example, when the sub-scanning direction position corrector 153 performs processing on the assumption that the sub-scanning direction displacement amount is constant over a sensor pixel row, the sub displacement correction amount setter 151 calculates an average of the sub-scanning direction displacement amounts at both ends of a target sensor pixel row, and then calculates the sub-scanning direction displacement correction amount. Also, when the sub-scanning direction position corrector 153 performs correction of the sub-scanning direction displacement amount in accordance with the inclinations of the sensor pixel rows, the sub displacement correction amount setter 151 calculates sub-scanning direction displacement correction amounts at predetermined intervals in the main scanning direction of a target sensor pixel row.

The image memory 152 is a temporary storage that temporarily stores the first read image data items EHa to EHc corresponding to the first sensor pixel rows 111a to 111c.

For example, the image memory 152 temporarily stores a single-line data item that is pixel data items corresponding to a single line in the main scanning direction of each of the first read image data items EHa to EHc.

The sub-scanning direction position corrector 153 corrects the positional displacement in the sub-scanning direction between the first read image data items EHa to EHc and the second read image data items OHa to OHc by reading the first read image data items EHa to EHc temporarily stored in the image memory 152, on the basis of the sub-scanning direction displacement correction amounts set from the sub displacement correction amount setter 151.

For example, the sub-scanning direction position corrector 153 corrects the displacement in the sub-scanning direction by storing a single-line data item of each of the first read image data items EHa to EHc in the image memory 152 and reading the single-line data items from the image memory 152 in accordance with the time at which the image obtaining unit 140 obtains the pixel data items of a corresponding single line of the second read image data items OHa to OHc.

Then, the sub-scanning direction position corrector 153 provides the image data separator 155 with sub corrected image data items and the second read image data items that are aligned in the sub-scanning direction.

The main overlap processing amount setter 154 receives input of main scanning direction overlap amount information indicating overlap pixel numbers that are the numbers of pixels overlapping in the main scanning direction in the first sensor pixel rows 111a to 111c and second sensor pixel rows 112a to 112c of the line sensor 110, and stores the main scanning direction overlap amount information in a memory 154a that is a main overlap amount storage.

The main scanning direction overlap amount information indicates a main scanning direction overlap amount that is the number of pixels overlapping in the main scanning direction between each pair overlapping each other in the main scanning direction in the first sensor pixel rows 111a to 111c and second sensor pixel rows 112a to 112c.

For example, in the example illustrated in FIG. 1, the main scanning direction overlap amount information indicates the number of pixels included in the region OR1 in the first sensor pixel row 111a and the number of pixels included in the region OR1 in the second sensor pixel row 112a, the number of pixels included in the region OR2 in the first sensor pixel row 111b and the number of pixels included in the region OR2 in the second sensor pixel row 112a, the number of pixels included in the region OR3 in the first sensor pixel row 111b and the number of pixels included in the region OR3 in the second sensor pixel row 112b, the number of pixels included in the region OR4 in the first sensor pixel row 111c and the number of pixels included in the region OR4 in the second sensor pixel row 112b, and the number of pixels included in the region OR5 in the first sensor pixel row 111c and the number of pixels included in the region OR5 in the second sensor pixel row 112c.

The main overlap processing amount setter 154 selects main scanning direction overlap amount(s) of the sensor pixel row corresponding to an image data item processed by the image data separator 155 and provides the image data separator 155 with the corresponding main scanning direction overlap processing amount(s), and selects main scanning direction overlap amount(s) of the sensor pixel row corresponding to an image data item processed by the interpolation image data generator 156 and provides the interpolation image data generator 156 with the corresponding main scanning direction overlap processing amount(s).

As with the sub-scanning direction displacement amounts, measurements of the main scanning direction overlap amounts may be performed inside the image reading device 100, or may be performed outside the image reading device 100. When the main scanning direction overlap amounts are measured inside the image reading device 100, the measurements may be performed by a portion, e.g., a main scanning direction overlap amount measurement unit, that is not illustrated in FIG. 1.

The main scanning direction overlap amounts include, in addition to design overlap amounts that are designed amounts of overlaps between the first sensor pixel rows 111a to 111c and the second sensor pixel rows 112a to 112c, mounting overlap amounts that are overlap amounts occurring during the actual mounting to a substrate or the like. The main scanning direction overlap amounts vary depending on the position where the correction is performed, and can be in decimal fraction units, which are finer than integer units that are pixel units. When a displacement occurs in the main scanning direction during mounting of a sensor pixel row, the main scanning direction overlap amount may be different between one end and the other end of the sensor pixel row.

Here, in the first embodiment, it is assumed that the main scanning direction overlap amount information indicates the overlap amounts in decimal fraction units. The main overlap processing amount setter 154 provides the interpolation image data generator 156 with fractional main scanning direction overlap processing amounts that indicate overlap amounts in decimal fraction units. Also, the main overlap processing amount setter 154 provides the image data separator 155 with integer main scanning direction overlap processing amounts obtained by changing the overlap amounts in decimal fraction units indicated by the main scanning direction overlap amount information into overlap amounts in integer units depending on a processing method in the interpolation image data generator 156.

The image data separator 155 separates the second read image data items output from the sub-scanning direction position corrector 153, in the main scanning direction, on the basis of the integer main scanning direction overlap processing amounts set from the main overlap processing amount setter 154, thereby generating overlapping image data items corresponding to portions overlapping the sub corrected image data items and non-overlapping image data items that do not overlap the sub corrected image data items. Here, the non-overlapping image data items separated from the second read image data items OHa and OHb obtained from the second sensor pixel rows 112a and 112b make pixel data items of pixels in the intervals between the first sensor pixel rows 111a to 111c.

Then, the image data separator 155 provides the overlapping image data items and sub corrected image data items to the interpolation image data generator 156, and provides the non-overlapping image data items to the image connector 157.

The interpolation image data generator 156 generates main corrected image data items by correcting displacements in the main scanning direction occurring between the overlapping image data items and the sub corrected image data items.

Also, the interpolation image data generator 156 generates interpolation image data items by adjusting the pixel data items of overlap pixels that are pixels of the main corrected image data items overlapping the second read image data items in the main scanning direction, between the main corrected image data items and the second read image data items. Here, the interpolation image data generator 156 modifies pixel values of portions of the main corrected image data items overlapping the second read image data items (overlapping image data items) on the basis of the overlapping image data items as needed, and generates interpolation image data items to be connected to the non-overlapping image data items.

Figure 3:
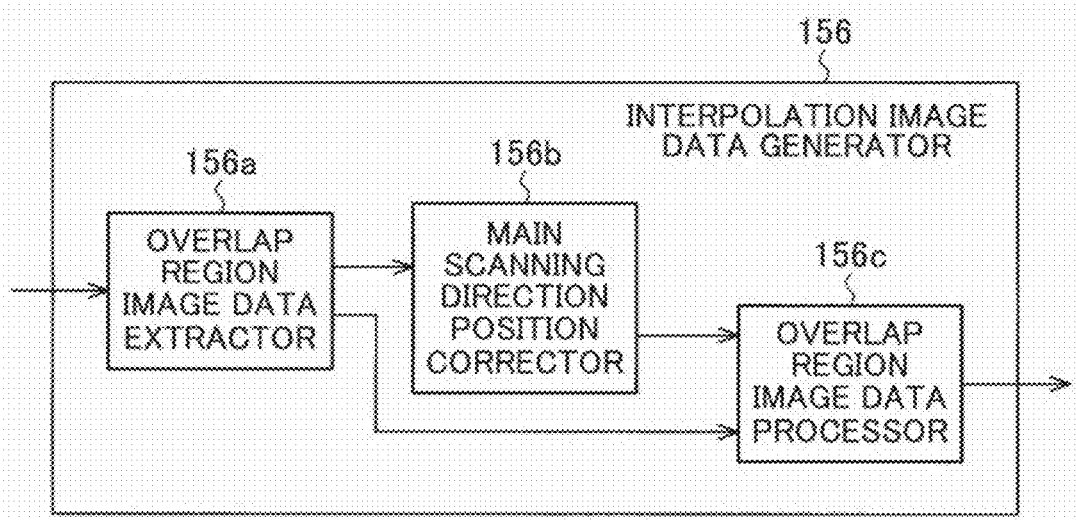
FIG. 3 is a block diagram schematically illustrating a configuration of an interpolation image data generator of the first embodiment.

FIG. 3 is a block diagram schematically illustrating a configuration of the interpolation image data generator 156.

The interpolation image data generator 156 includes an overlap region image data extractor 156a, a main scanning direction position corrector 156b, and an overlap region image data processor 156c.

The overlap region image data extractor 156a extracts, from the overlapping image data items and sub corrected image data items input thereto, the sub corrected image data items, provides the sub corrected image data items to the main scanning direction position corrector 156b, and provides the overlapping image data items to the overlap region image data processor 156c.

The main scanning direction position corrector 156b corrects positional displacements of the sub corrected image data items in decimal fraction units in the main scanning direction, and provides the corrected sub corrected image data items as the main corrected image data items to the overlap region image data processor 156c.

The overlap region image data processor 156c corrects pixel values of pixels of portions of the main corrected image data items overlapping the overlapping image data items as needed, and provides image data items resulting from the processing as the interpolation image data items to the image connector 157 illustrated in FIG. 2.

Returning to FIG. 2, the image connector 157 connects the non-overlapping image data items and interpolation image data items in accordance with the arrangement order in the main scanning direction in the original, and generates a line image data item on a line-by-line basis.

Figure 4A:
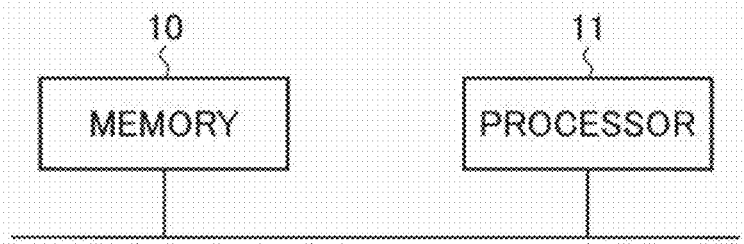
FIGS. 4A and 4B are block diagrams illustrating hardware configuration examples.

Part or the whole of the signal reader 120, image corrector 130, and image processor 150 described above can be implemented by a memory 10 and a processor 11, such as a central processing unit (CPU), that executes a program stored in the memory 10, as illustrated in FIG. 4A, for example. Such a program may be provided via a network, or may be stored and provided in a recording medium. Thus, such a program may be provided as a program product, for example.

Figure 4B:
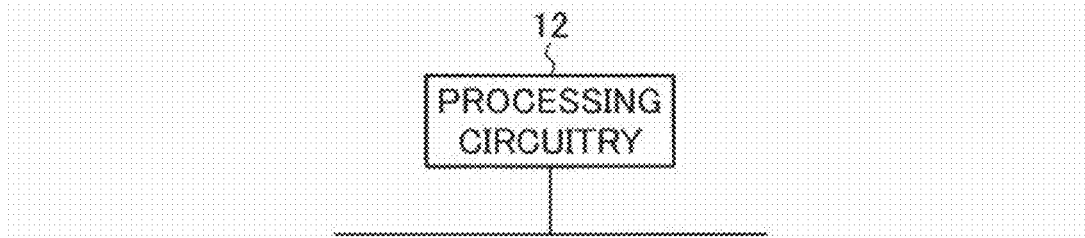

Also, part or the whole of the signal reader 120, image corrector 130, and image processor 150 can be implemented by processing circuitry 12, such as a single circuit, a composite circuit, a programmed processor, a parallel-programmed processor, an application specific integrated circuit (ASIC), or a field programmable gate array (FPGA), as illustrated in FIG. 4B, for example.

As above, the signal reader 120, image corrector 130, and image processor 150 can be implemented by a processing circuit network.

Next, an operation of the image reading device 100 in the first embodiment will be described.

Figure 5:
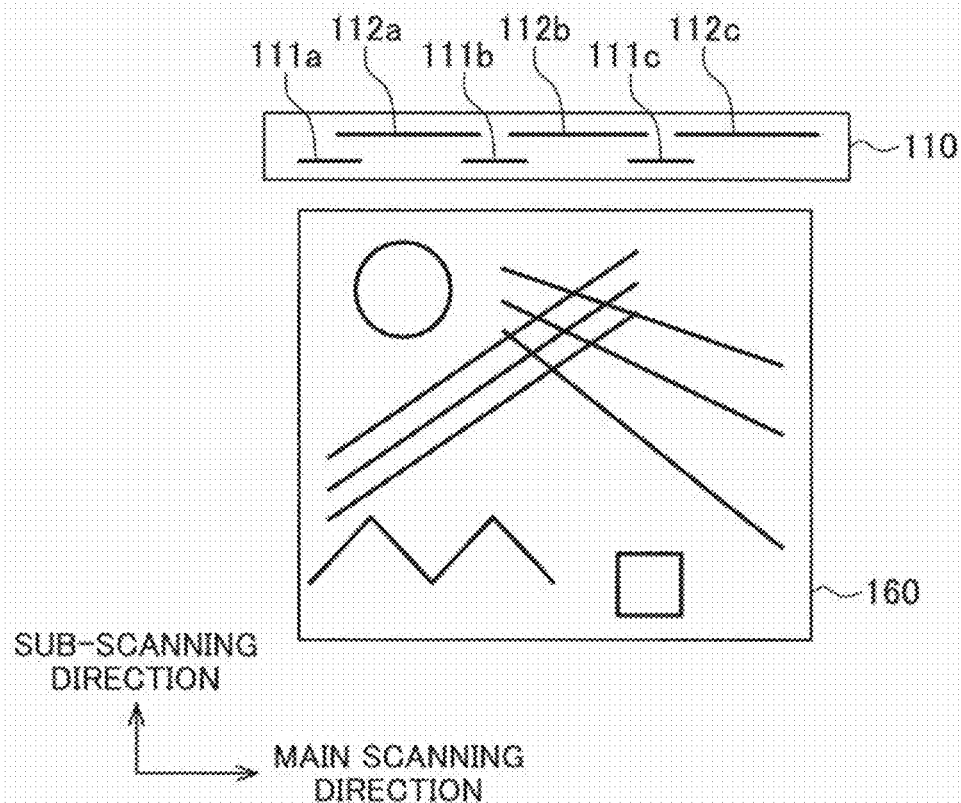
FIG. 5 is a schematic diagram illustrating an example of an arrangement of a line sensor and an original.

In the first embodiment, it is assumed that the line sensor 110 of the image reading device 100 and an original 160 are placed as illustrated in FIG. 5.

Also, it is assumed that the original 160 is conveyed from a side on which the first sensor pixel rows 111a to 111c of the line sensor 110 are disposed, to a side on which the second sensor pixel rows 112a to 112c are disposed.

Although it is possible that the line sensor 110 is moved from an upper portion toward a lower portion of the original 160, it is assumed in the first embodiment that the reading is performed by conveying the original 160.

Figure 6:
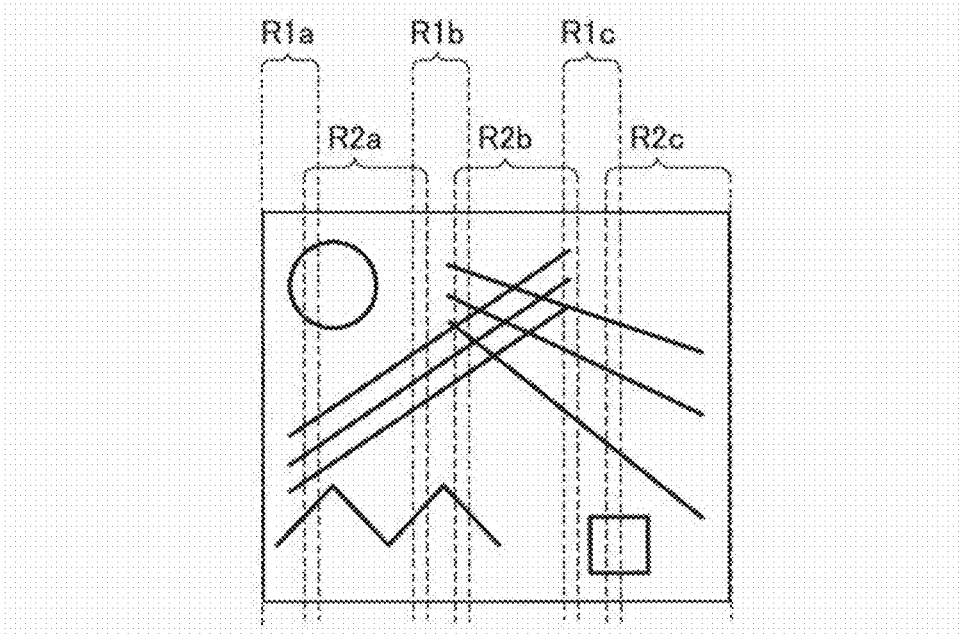
FIG. 6 is a schematic diagram for explaining an area in which each of first sensor pixel rows and second sensor pixel rows reads an image from the original.

FIG. 6 is a schematic diagram for explaining an area in which each of the first sensor pixel rows 111a to 111c and second sensor pixel rows 112a to 112c reads an image from the original 160.

The first sensor pixel rows 111a to 111c and second sensor pixel rows 112a to 112c are arranged so that their ends in the main scanning direction overlap a little. Thus, the areas read by the sensor pixel rows overlap as illustrated in FIG. 6.

In FIG. 6, reading areas R1a to R1c respectively correspond to the areas read by the first sensor pixel rows 111a to 111c, and reading areas R2a to R2c respectively correspond to the areas read by the second sensor pixel rows 112a to 112c.

In the image reading device 100, while the original 160 is conveyed, the signal reader 120 receives the electrical signals output from the sensor pixel rows, on a line-by-line basis.

Figure 7A:
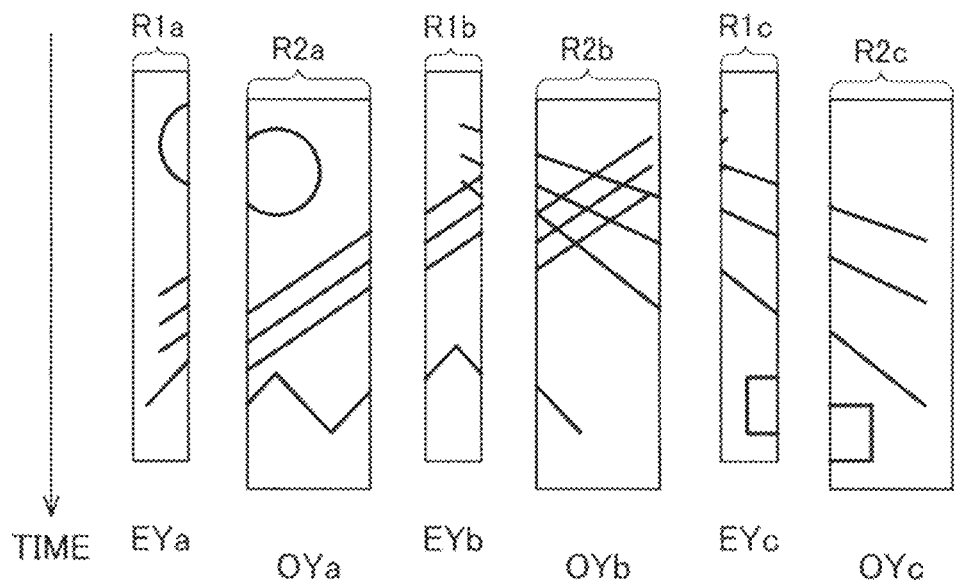
FIGS. 7A and 7B are schematic diagrams for explaining processing of an image read from each of the first sensor pixel rows and second sensor pixel rows.

Since the first sensor pixel rows 111a to 111c and second sensor pixel rows 112a to 112c are spaced from each other in the sub-scanning direction, the image data items read at the same time are from different positions of the original 160 in the sub-scanning direction. Thus, as illustrated in FIG. 7A, the first image data items EYa to EYc and second image data items OYa to OYc, which are different in read time, are output from the signal reader 120.

Figure 7B:
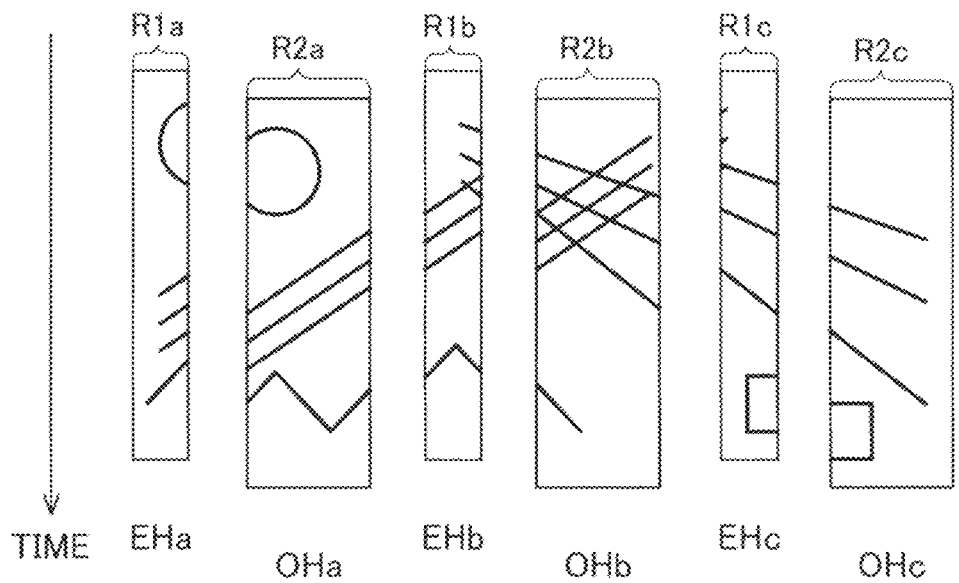

A required image correction is performed by the image corrector 130 for each sensor pixel row, and the first read image data items EHa to EHc and second read image data items OHa to OHc, which are different in read time as with the first image data items EYa to EYc and second image data items OYa to OYc, are output (see FIG. 7B).

The first read image data items EHa to EHc and second read image data items OHa to OHc are input to the sub-scanning direction position corrector 153 of the image processor 150.

Since the first read image data items EHa to EHc have read start times in the sub-scanning direction earlier than those of the second read image data items OHa to OHc, the sub-scanning direction position corrector 153 distinguishes between the first read image data items EHa to EHc and the second read image data items OHa to OHc. Then, to absorb the difference in read time in the sub-scanning direction, the sub-scanning direction position corrector 153 temporarily stores the first read image data items EHa to EHc in the image memory 152.

It is assumed that the read image data items are associated with the sensor pixel rows by a method such as assigning a separate input port to each sensor pixel row or adding data items identifying the sensor pixel rows to the image data items.

After that, by reading, from the image memory 152, the first read image data items EHa to EHc from the first lines on a line-by-line basis in synchronization with inputs of the valid line images at the first lines of the second read image data items OHa to OHc after the original 160 is conveyed by amounts corresponding to the numbers of lines corresponding to the sub-scanning direction displacement amounts between the first sensor pixel rows 111a to 111c and the second sensor pixel rows 112a to 112c, it is possible to output image data items whose positions in the sub-scanning direction have been corrected.

The sub displacement correction amount setter 151 sets, from the sub-scanning direction displacement amount information, sub-scanning direction displacement correction amount(s) corresponding to each of the first read image data items EHa to EHc and second read image data items OHa to OHc input to the sub-scanning direction position corrector 153, in the sub-scanning direction position corrector 153. The sub-scanning direction displacement correction amount(s) may vary between the sensor pixel rows. Thus, the sub displacement correction amount setter 151 sets the sub-scanning direction displacement correction amount(s) depending on which sensor pixel row is a target of the correction processing in the sub-scanning direction position corrector 153.

The sub-scanning direction position corrector 153 corrects the positional displacement between the images by determining, based on the sub-scanning direction displacement correction amounts set therein, times to read the first read image data items EHa to EHc temporarily stored in the image memory 152 and eliminating the time difference in the sub-scanning direction between the first read image data items EHa to EHc and the second read image data items OHa to OHc. When the sub-scanning direction displacement correction amounts are integers, it is only required to synchronize the starts of readings of the first read image data items EHa to EHc from the image memory 152. However, when the sub-scanning direction displacement correction amounts are decimal fractions, the sub-scanning direction position corrector 153 also applies resampling processing. A common interpolation process may be used for the resampling processing, and the sub-scanning direction position corrector 153 may perform resampling processing on either or both of the first read image data items EHa to EHc and the second read image data items OHa to OHc.

The sub-scanning direction position corrector 153 adjusts starting times of readings of the image data items from the image memory 152 in view of the used process and the input times of the second read image data items OHa to OHc.

Figure 8:
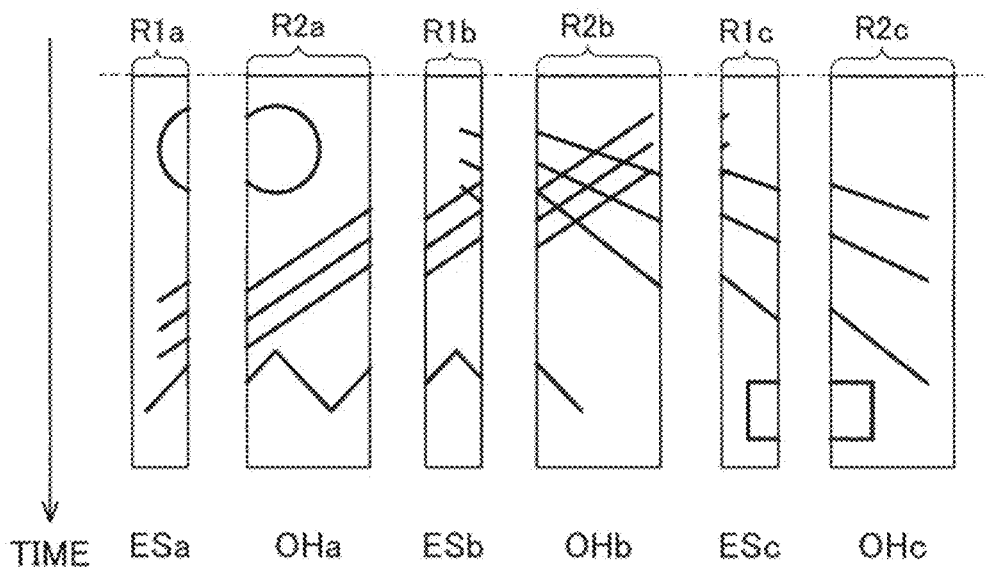
FIG. 8 is a schematic diagram for explaining second read image data items and sub corrected image data items.

In this manner, as illustrated in FIG. 8, sub corrected image data items ESa to ESc in which the read time difference in the sub-scanning direction of the first read image data items EHa to EHc, i.e., the positional displacement of the images in the sub-scanning direction, has been eliminated, and the second read image data items OHa to OHc are output from the sub-scanning direction position corrector 153 on a line-by-line basis in a state in which they still overlap in the main scanning direction.

The image data separator 155 separates, from the second read image data items OHa to OHc, the overlapping image data items corresponding to the portions overlapping the sub corrected image data items ESa to ESc on the basis of the integer main scanning direction overlap processing amounts set from the main overlap processing amount setter 154, and provides the overlapping image data items and sub corrected image data items ESa to ESc to the interpolation image data generator 156. Also, the image data separator 155 provides the image connector 157 with the non-overlapping image data items that are partial image data items remaining after the separation of the overlapping image data items from the second read image data items OHa to OHc.

Figure 9:
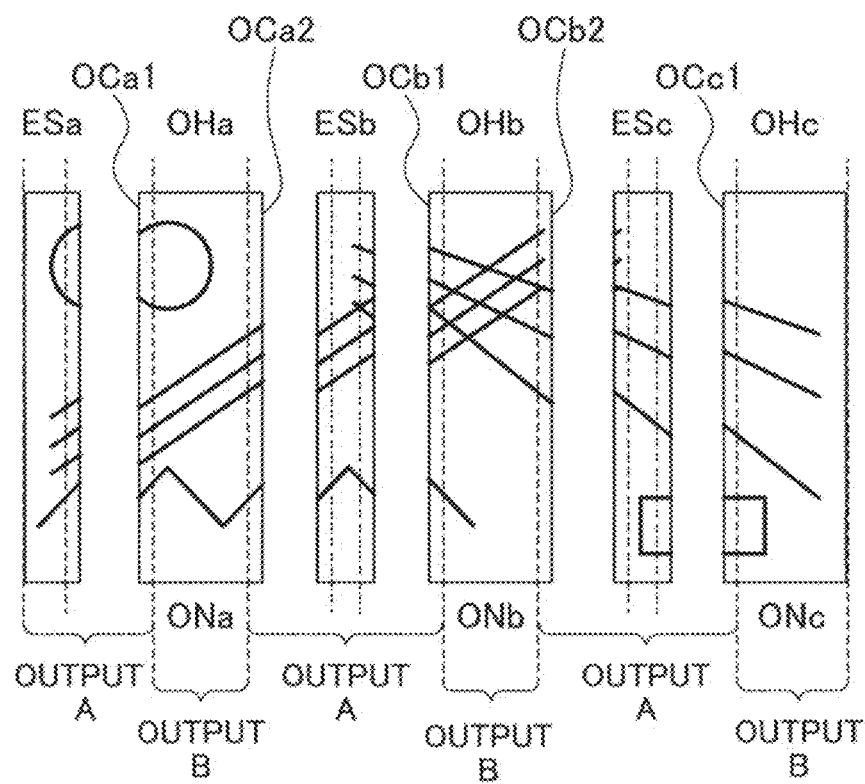
FIG. 9 is a schematic diagram for explaining a process in an image data separator.

FIG. 9 is a schematic diagram for explaining a process in the image data separator 155.

The image data separator 155 separates, from the second read image data item OHa, an overlapping image data item OCa1 overlapping the sub corrected image data item ESa and an overlapping image data item OCa2 overlapping the sub corrected image data item ESb.

Also, the image data separator 155 separates, from the second read image data item OHb, an overlapping image data item OCb1 overlapping the sub corrected image data item ESh and an overlapping image data item OCb2 overlapping the sub corrected image data item ESc.

Moreover, the image data separator 155 separates, from the second read image data item OHc, an overlapping image data item OCc1 overlapping the sub corrected image data item ESc.

Then, the image data separator 155 provides the interpolation image data generator 156 with the sub corrected image data items ESa, ESb, and ESc and the overlapping image data items OCa1, OCa2, OCb1, OCb2, and OCc1, as an output A.

Also, the image data separator 155 provides the image connector 157 with a non-overlapping image data item ONa, remaining after the separation of the overlapping image data items OCa1 and OCa2 from the second read image data item OHa, a non-overlapping image data item ONb remaining alter the separation of the overlapping image data items OCb1 and OCb2 from the second read image data item OHb, and a non-overlapping image data item ONc remaining after the separation of the overlapping image data item OCc1 from the second read image data item OHc, as an output B.

In the interpolation image data generator 156, the overlap region image data extractor 156a provides the main scanning direction position corrector 156b with the sub corrected image data items Esa, ESb, and ESc, and provides the overlap region image data processor 156c with the overlapping image data items OCa1, OCa2, OCb1, OCb2, and OCc1, out of the sub corrected image data items ESa, ESb, and ESc and overlapping image data items OCa1, OCa2, OCb1, OCb2, and OCc1 provided thereto.

FIGS. 10A and 10B are schematic diagrams for explaining a process of correcting displacements in the main scanning direction in the main scanning direction position corrector 156b.

Here, it is assumed that as illustrated in FIG. 10A, 4 pixels at a right end of the first sensor pixel row 111b and 4 pixels at a left end of the second sensor pixel row 112b overlap in an overlap region R2b-L, and 5.2 pixels at a right end of the second sensor pixel row 112b and 5.2 pixels at a left end of the first sensor pixel row 111c overlap in an overlap region R2b-R.

In the example illustrated in FIG. 10A, there is a positional displacement in decimal fraction units in the overlap region R2b-R. The main scanning direction position corrector 156b corrects the positional displacement in decimal fraction units, thereby outputting a main corrected image data item EMc as illustrated in FIG. 10B.

In the overlap region R2b-L, since there is no positional displacement in decimal fraction units, the main scanning direction position corrector 156b performs no correction. Thus, a main corrected image data item EMb is the same as the sub corrected image data item ESb.

Here, a common interpolation process may be used for the process of correcting a positional displacement in decimal fraction units, as with the sub-scanning direction position corrector 153.

In the example illustrated in FIGS. 10A and 10B, the main scanning direction position corrector 156b shifts the sub corrected image data item ESc by 0.2 pixels to the right.

However, the first embodiment is not limited to such an example. For example, the main scanning direction position corrector 156b may shift it by 0.8 pixels to the left and make the second read image data item OHb and main corrected image data item EMc overlap by 6 pixels.

Here, the main overlap processing amount setter 154 should calculate the integer main scanning direction overlap processing amounts set in the image data separator 155, depending on the processing method in the main scanning direction position corrector 156b.

The main scanning direction position corrector 156b may correct the positional displacements in the main scanning direction only for the pixels overlapping the overlapping image data items, out of the pixels of the sub corrected image data items.

As above, the main scanning direction position corrector 156b provides the overlap region image data processor 156c with the main corrected image data items obtained by correcting the pixel displacements in decimal fraction units in the main scanning direction.

The overlap region image data processor 156c corrects pixel values of the pixels of the main corrected image data items that overlap the overlapping image data items, as needed, and provides the image connector 157 illustrated in FIG. 2 with image data items resulting from the processing as the interpolation image data items.

FIGS. 11A to 11F are schematic diagrams for explaining a process in the overlap region image data processor 156c.

Here, there will be described an example in which processing is performed using the main corrected image data items EMb and EMc and overlapping image data items OCb1 and OCb2.

Figure 11A:
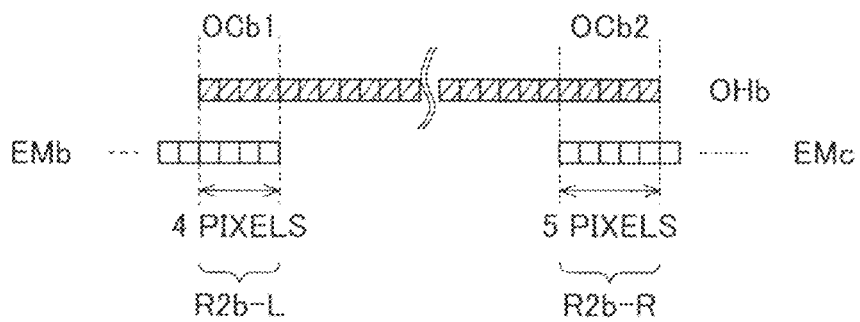
FIGS. 11A to 11F are schematic diagrams for explaining a process in an overlap region image data processor.

As illustrated in FIG. 11A, the main corrected image data item EMb overlaps the overlapping image data item OCb1 by 4 pixels in the overlap region R2b-L, and the main corrected image data item EMc overlaps the overlapping image data item OCb2 by 5 pixels in the overlap region R2b-R.

FIGS. 11B to 11F are graphs illustrating a ratio of mixing the pixels in the overlap region R2b-L of the main corrected image data item EMb and the pixels of the overlapping image data item OCb1, and a ratio of mixing the pixels in the overlap region R2b-R of the main corrected image data item EMc and the pixels of the overlapping image data item OCb2.

In each graph, the horizontal axis represents pixel positions in the main scanning direction, and the vertical axis is the mixing ratio that takes a value from 0 to 1. The solid line represents the proportion of the pixel value of the second read image data item OHb, and the dotted line represents the proportion of the main corrected image data items EMb and EMc. The sum of the proportions at each pixel position is set to be equal to 1.

Figure 11B:
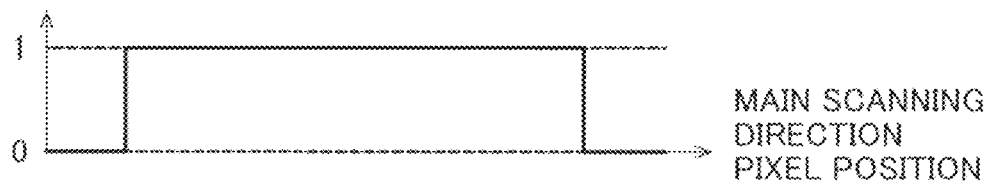

FIG. 11B is an example in which the pixels in the overlap region R2b-L of the main corrected image data item EMb are replaced with the pixels of the overlapping image data item OCb1, and the pixels in the overlap region R2b-R of the main corrected image data item EMc are replaced with the pixels of the overlapping image data item OCb2.

Figure 11C:
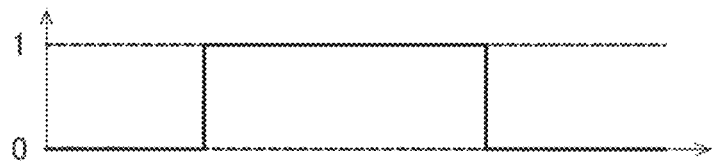

FIG. 11C is an example in which the pixels in the overlap region R2b-L of the main corrected image data item EMb are left as they are, and the pixels in the overlap region R2b-R of the main corrected image data item EMc are left as they are.

Figure 11D:
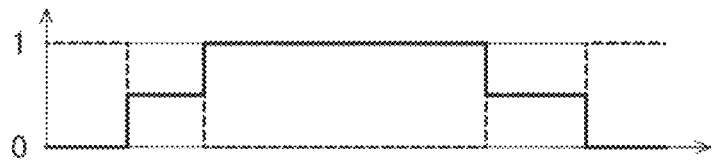

FIG. 11D is an example in which the pixels in the overlap region R2b-L of the main corrected image data item EMb are mixed with the pixels of the overlapping image data item OCb1 at a ratio of 1:1, and the pixels in the overlap region R2b-R of the main corrected image data item EMc are mixed with the pixels of the overlapping image data item OCb2 at a ratio of 1:1.

Figure 11E:
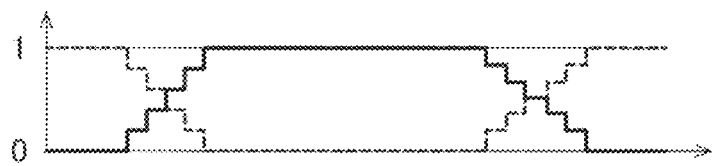

FIG. 11E is a first example in which the pixels in the overlap region R2b-L of the main corrected image data item EMb are mixed with the pixels of the overlapping image data item OCb1 such that the proportion of the pixel of the overlapping image data item OCb1 increases toward an end of the main corrected image data item EMb, and the pixels in the overlap region R2b-R of the main corrected image data item EMc are mixed with the pixels of the overlapping image data item OCb2 such that the proportion of the overlapping image data item OCb2 increases toward an end of the main corrected image data item EMc.

In the first example, the rate of increase in the proportion of the overlapping image data item OCb2 is constant toward the end of the main corrected image data item EMb or toward the end of the main corrected image data item EMc.

Figure 11F:

FIG. 11F is a second example in which the pixels in the overlap region R2b-L of the main corrected image data item EMb are mixed with the pixels of the overlapping image data item OCb1 such that the proportion of the pixel of the overlapping image data item OCb1 increases toward the end of the main corrected image data item EMb, and the pixels in the overlap region R2b-R of the main corrected image data item EMc are mixed with the pixels of the overlapping image data item OCb2 such that the proportion of the overlapping image data item OCb2 increases toward the end of the main corrected image data item EMc.

In the second example, the rate of increase in the proportion of the overlapping image data item OCb2 increases toward the end of the main corrected image data item EMb or toward the end of the main corrected image data item EMc.

In FIGS. 11B and 11C, since there is no pixel data mixing in the overlap regions, image data with relatively less blur is obtained. However, for example, when the original slightly waves while being conveyed, a difference in image quality, such as a difference in image brightness, that cannot be sufficiently corrected by the image corrector 130 may occur between the first image data items EYa to EYc and the second image data items OYa to OYc, due to variation in how it is illuminated, or the like.

When image data items of the overlap regions are generated by simply averaging as in FIG. 11D, only the overlap regions have pixel data items different from any of the second read image data item OHb and main corrected image data items EMb and EMc, a difference in image quality occurs between the second read image data item OHb and the main corrected image data items EMb and EMc, and the positions of the image data changes in the main scanning direction are noticeable.

Thus, by finely setting the mixing ratio on a pixel-by-pixel basis and smoothly mixing the image data items in the overlap regions as in FIG. 11E or 11F, the positions of the image data changes in the main scanning direction can be made unnoticeable.

The overlap region image data processor 156c may prepare multiple settings of the mixing ratio as illustrated in FIGS. 11B to 11F and switch the mixing ratio in accordance with an original content discrimination signal (not illustrated) from the outside.

That is, the overlap region image data processor 156c may have multiple methods for adjusting the pixel data items of the overlap pixels and be configured so that it can select a method for adjusting the pixel data items of the overlap pixels from among the multiple methods.

In this manner, interpolation image data items ERa to ERc corresponding to the main corrected image data items EMa to EMc are output from the overlap region image data processor 156c. Excluding the overlap regions, the pixel data items of the interpolation image data items ERa to ERc are the same as the pixel data items of the main corrected image data items EMa to EMc, regardless of the content of the processing in the overlap region image data processor 156c.

The image connector 157 connects the interpolation image data items ERa to ERc output from the interpolation image data generator 156 and the non-overlapping image data items ONa to ONc output from the image data separator 155, in the main scanning direction, and generates a line image data item.

The image reading device 100 repeats image reading on a line-by-line basis while conveying the original 160 in the sub-scanning direction, as described above, and eventually outputs image data of an image that is the same as that of the original 160 illustrated in FIG. 5.

In the first embodiment, it is described that the separation and extraction of image data are performed by the image data separator 155 and overlap region image data extractor 156a, which are separately provided. However, the image data separator 155 may further perform sorting of image data and provide the same function.

In the first embodiment, in the sub-scanning direction position corrector 153, the first read image data items EHa to EHc are corrected. However, the second read image data items OHa to OHc may be corrected, or both the first read image data items EHa to EHc and second read image data items OHa to OHc may be corrected.

In the first embodiment, the line sensor 110 is described as a monochrome sensor constituted by one pair of lines arranged in the sub-scanning direction. However, even when the line sensor 110 is a color sensor constituted by multiple pairs of lines arranged in the sub-scanning direction, it is possible to obtain a color image with high accuracy by performing the same processing as described above for each pair.

As described above, with the image reading device 100 according to the first embodiment, even in the case of using a high-resolution sensor, it is possible to accurately read an image without lack of pixel data between sensor pixel rows.

Also, with the image reading device 100 according to the first embodiment, since the number of pixels of each of the first sensor pixel rows 111a to 111c is less than that of each of the second sensor pixel rows 112a to 112c, it is possible to reduce the capacity of the image memory 152 as compared to the case of using sensor pixel rows having the same number of pixels.

Also, with the image reading device 100 according to the first embodiment, it is possible to correct the positional displacements in the sub-scanning direction and main scanning direction while changing the displacement amount depending on the position of the target sensor pixel row.

Also, with the image reading device 100 according to the first embodiment, since the position correction in the sub-scanning direction and the position correction in the main scanning direction are performed on only the image data items read from the first sensor pixel rows 111a to 111c having less pixels, it is possible to reduce the image data area in which high-frequency components are reduced due to the correction processing.

Also, with the image reading device 100 according to the first embodiment, by providing multiple methods for generating image data items of the overlap regions in the overlap region image data processor 156c and switching between them, it is possible to generate image data appropriate for the content of the original.

Also, with the image reading device 100 according to the first embodiment, by limiting the area subject to the overlap region image data generation process in the interpolation image data generator 156 to the overlap regions R2b-L and R2b-R, it is possible to reduce the image data area in which high-frequency components are reduced due to the mixing.

Second Embodiment

Figure 12:
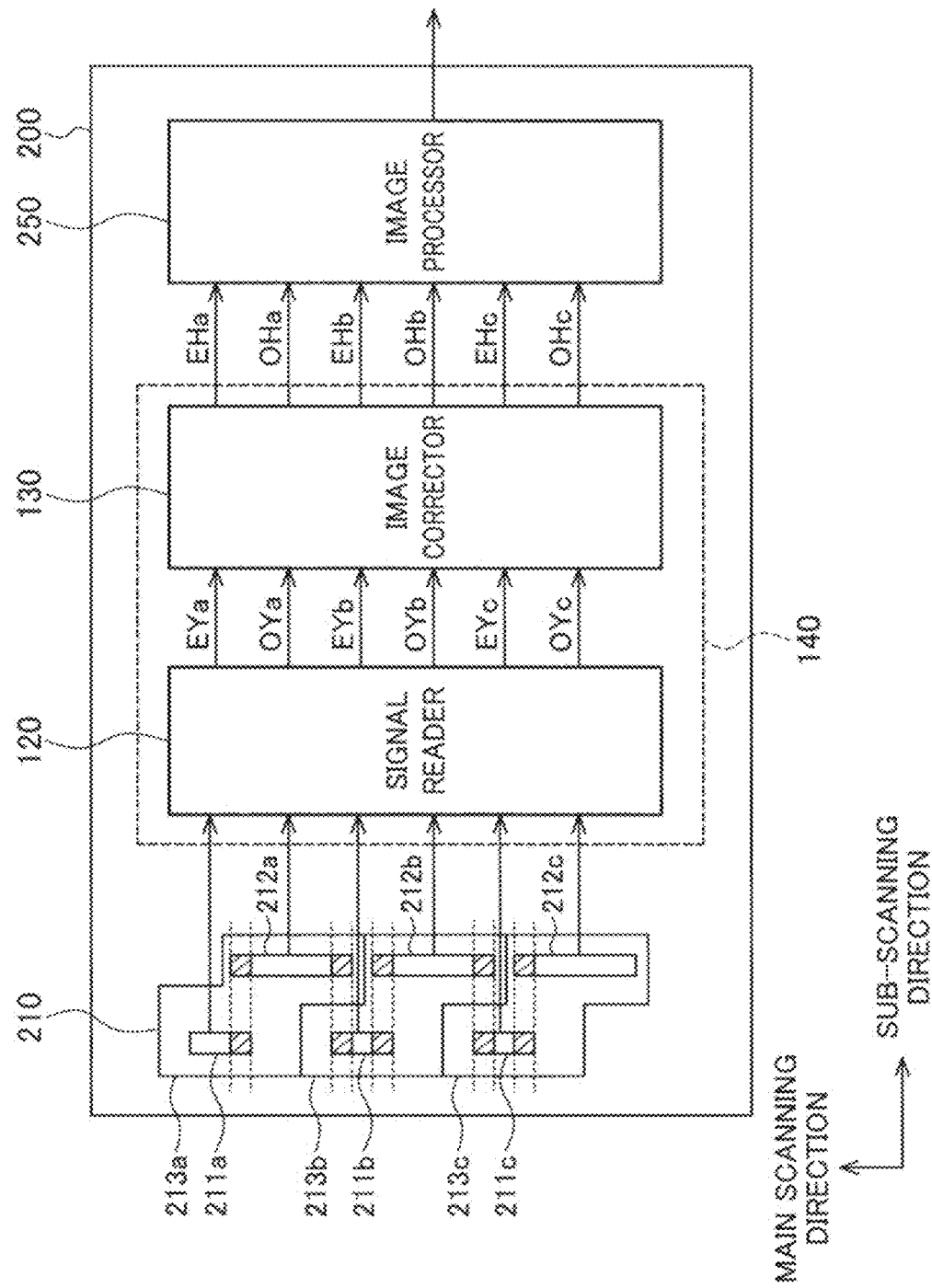
FIG. 12 is a block diagram illustrating a configuration of a main portion of an image reading device according to a second embodiment.

FIG. 12 is a block diagram illustrating a configuration of a main portion of an image reading device 200 according to a second embodiment.

The main portion of the image reading device 200 according to the second embodiment includes a line sensor 210, a signal reader 120, an image corrector 130, and an image processor 250.

The signal reader 120 and image corrector 130 of the image reading device 200 according to the second embodiment are the same as the signal reader 120 and image corrector 130 of the image reading device 100 according to the first embodiment. Thus, also in the second embodiment, the signal reader 120 and image corrector 130 constitute an image obtaining unit 140.

In the line sensor 110 of the first embodiment, the first sensor pixel rows 111a to 111c and second sensor pixel rows 112a to 112c are spaced an arbitrary number of pixels from each other in the sub-scanning direction such that their ends in the main scanning direction overlap each other by about several pixels.

On the other hand, the line sensor 210 of the second embodiment is configured by arranging, in the main scanning direction, a sensor chip 213a including a pair of a first sensor pixel row 211a and a second sensor pixel row 212a that are adjacent two rows, a sensor chip 213b including a pair of a first sensor pixel row 211b and a second sensor pixel row 212b that are adjacent two rows, and a sensor chip 213c including a pair of a first sensor pixel row 211c and a second sensor pixel row 212c that are adjacent two rows.

Figure 13:
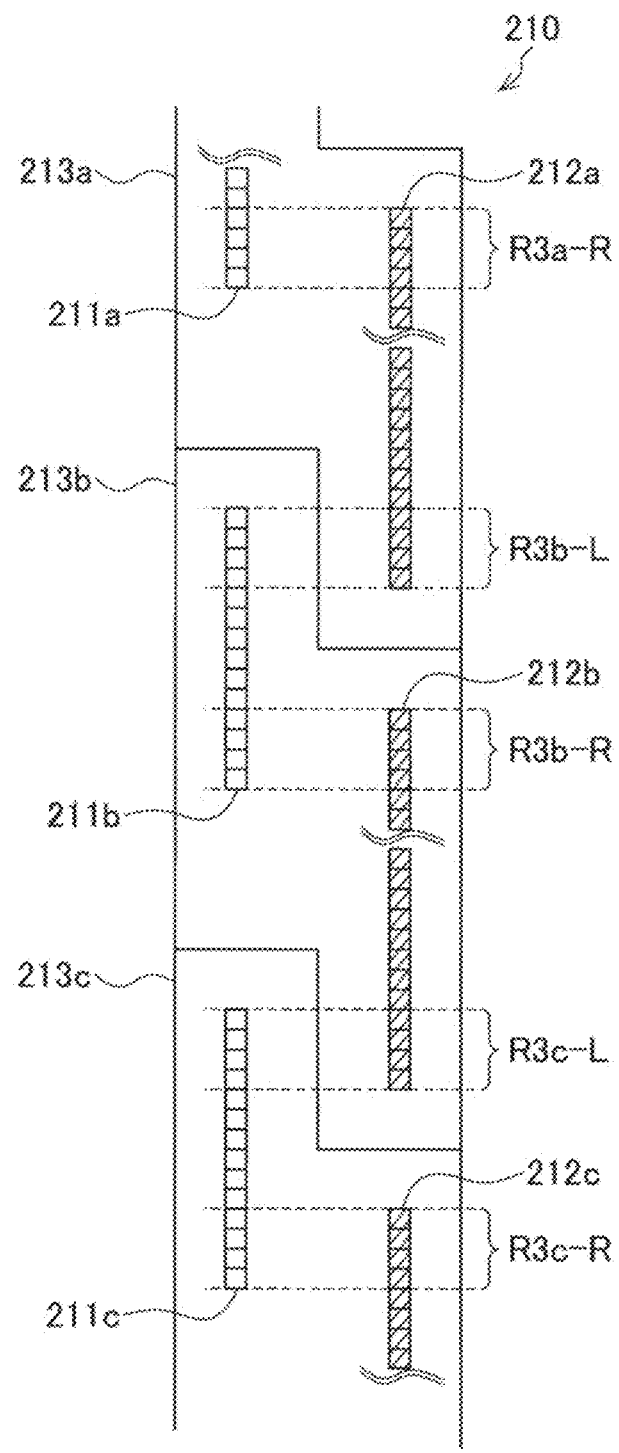
FIG. 13 is a partially enlarged view for explaining a line sensor of the second embodiment.

FIG. 13 is a partially enlarged view for explaining the line sensor 210 of the second of embodiment.

The first sensor pixel row 211a and second sensor pixel row 212a overlap in an overlap region R3a-R in the main scanning direction.

The first sensor pixel row 211b and second sensor pixel row 212a overlap in an overlap region R3b-L in the main scanning direction.

The first sensor pixel row 211b and second sensor pixel row 212b overlap in an overlap region R3b-R in the main scanning direction.

The first sensor pixel row 211c and second sensor pixel row 212b overlap in an overlap region R3c-L in the main scanning direction.

The first sensor pixel row 211c and second sensor pixel row 212c overlap in an overlap region R3c-R in the main scanning direction.

Although in FIG. 13, the line sensor 210 is constituted by the six sensor pixel rows, i.e., the three sensor chips 213a to 213c, it is sufficient that the line sensor 210 include at least one sensor chip. In this case, it is necessary to add a sensor chip in the first embodiment including only one first sensor pixel row to the line sensor. However, when the line sensor 210 is formed by using only the sensor chip in the second embodiment, the line sensor 210 needs to include at least two sensor chips.

The number of pixels in the main scanning direction of each of the first sensor pixel rows 211a to 211c in FIG. 13 is less than the number of pixels in the main scanning direction of each of the second sensor pixel rows 212a to 212c.

Moreover, the number of pixels in the main scanning direction of each of the second sensor pixel rows 212a to 212c is greater than the number of pixels corresponding to peripheral portions around the first sensor pixel rows 211a to 211c where no pixel can be arranged in the main scanning direction and that occur during manufacturing of the sensor chips 213a to 213c, and is a necessary and sufficient number of pixels for execution of processing on pixel data items in the overlap regions R3a-R, R3b-L, R3b-R, R3c-L, and R3c-R in an overlap region image data processor 156c regardless of pixel displacement in the main scanning direction.

In the second embodiment, the number of pixels in the main scanning direction of each of the first sensor pixel rows 211a to 211c is 14.

A distance between the first sensor pixel rows 211a to 211c and the second sensor pixel rows 212a to 212c in the sub-scanning direction is set to be as small as possible so that the capacity of the image memory 152 can be minimized.

Here, a description will be made by using the sensor chip 213b illustrated in FIG. 13.

In the sensor chip 213b, since the first sensor pixel row 211b and second sensor pixel row 212b are disposed on the same base, such as a semiconductor substrate, a main scanning direction overlap amount and a sub-scanning direction displacement amount in the overlap region R3b-R between the first sensor pixel row 211b and the second sensor pixel row 212b in the same chip can be regarded as fixed values, as compared to the case of arranging two sensor pixel rows in the first embodiment. Moreover, in the case of arrangement on the same base, it is possible to arrange the sensor pixel rows with relatively high accuracy, and it is also possible to perform control so that a main scanning direction overlap amount between the first sensor pixel row 211b and the second sensor pixel row 212b is in integer pixel units. The same applies to the sensor chips 213a and 213c.

Also, in the overlap region R3b-L across a boundary between the sensor chips 213a and 213b, e.g., the second sensor pixel row 212a and the first sensor pixel row 211b, positional displacement may occur during mounting of the sensor chips. Thus, it is difficult to set main scanning direction overlap amounts in all the boundaries between the sensor chips to fixed values. However, when a reading resolution in the main scanning direction of the image reading device 200 is as high as 1200 dpi or 2400 dpi, a pixel pitch of the sensor pixel rows is as small as 21.2 to 10.6 μm, and the main scanning direction overlap amounts are likely to be in integer units.

Thus, in the second embodiment, the main scanning direction overlap amounts are in integer units.

As illustrated in FIG. 2, the image processor 250 of the second embodiment includes a sub displacement correction amount setter 151, an image memory 152, a sub-scanning direction position corrector 153, a main overlap processing amount setter 254, an image data separator 155, an interpolation image data generator 256, and an image connector 157.

The main overlap processing amount setter 254 receives input of main scanning direction overlap amount information indicating the numbers of pixels overlapping in the main scanning direction in sensor pixel row ends of the first sensor pixel rows 211a to 211c and second sensor pixel rows 212a to 212c of the line sensor 210, and stores the main scanning direction overlap amount information in a memory 254a that is a main overlap amount storage.

The main overlap processing amount setter 254 selects main scanning direction overlap amount(s) of the sensor pixel row corresponding to an image data item processed by the image data separator 155 and provides the image data separator 155 with the corresponding main scanning direction overlap processing amount(s), and selects main scanning direction overlap amount(s) of the sensor pixel row corresponding to an image data item processed by the interpolation image data generator 256 and provides the interpolation image data generator 256 with the corresponding main scanning direction overlap processing amount(s).

The main scanning direction overlap amounts include, in addition to design overlap amounts that are designed amounts of overlaps between the first sensor pixel rows 211a to 211c and the second sensor pixel rows 212a to 212c, mounting overlap amounts that are overlap amounts occurring during the actual mounting to a substrate or the like. In the second embodiment, the main scanning direction overlap amounts are in integer units, as described above.

Then, the main overlap processing amount setter 254 provides the interpolation image data generator 256 and image data separator 155 with integer main scanning direction overlap processing amounts indicating the main scanning direction overlap amounts in integer units.

The interpolation image data generator 256 generates interpolation image data items by adjusting the pixel data items of overlap pixels that are pixels of the sub corrected image data items overlapping the second read image data items in the main scanning direction, between the sub corrected image data items and the second read image data items. For example, the interpolation image data generator 256 modifies pixel values of portions of the sub corrected image data items overlapping the second read image data items (overlapping image data items) on the basis of the overlapping image data items as needed, and generates interpolation image data items to be connected to the non-overlapping image data items.

Figure 14:
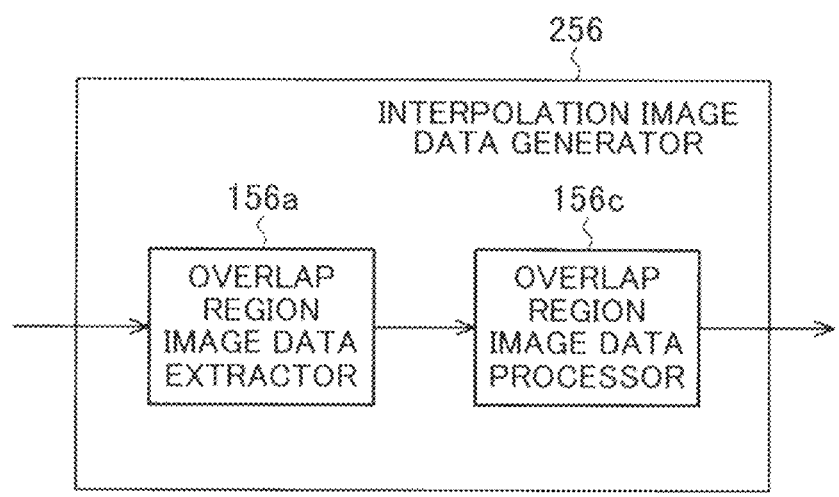
FIG. 14 is a block diagram schematically illustrating a configuration of an interpolation image data generator.

FIG. 14 is a block diagram schematically illustrating a configuration of the interpolation image data generator 256.

The interpolation image data generator 256 includes an overlap region image data extractor 156a and the overlap region image data processor 156c.

In the second embodiment, since the overlap amounts in the main scanning direction are in integer units, the main scanning direction position corrector 156b in the first embodiment is unnecessary.

Thus, the overlap region image data processor 156c performs processing by using the sub corrected image data items instead of the main corrected image data items.

The content of processing by the overlap region image data extractor 156a and overlap region image data processor 156c in the second embodiment is the same as the content of processing by the overlap region image data extractor 156a and overlap region image data processor 156c in the first embodiment.

As above, in the second embodiment, by using the sensor chips 213a, 213b, and 213c to form the line sensor 210, it is possible at least to set a positional displacement in the main scanning direction in the overlap region between the two sensor pixel rows included in each of the sensor chips 213a, 213b, and 213c to be in integer units, and thus it is possible to eliminate the processing regarding positional displacement correction in the main scanning direction.

Also, with the image reading device 200 according to the second embodiment, since the number of pixels of the first sensor pixel rows 211a to 211c disposed on the upstream side is a necessary and sufficient number of pixels for execution of processing by the overlap region image data processor 156c as compared to the second sensor pixel, rows 212a to 212c, it is possible to reduce the number of pixels in the main scanning direction of the overlap regions subject to correction or mixing. Thus, it is possible to reduce the image data area in which high-frequency components are reduced.

Although in FIG. 13, each of the sensor chips 213a to 213c has a wide shape obtained by combining two rectangles in the sub-scanning direction, it is sufficient that two sensor pixel rows can be formed at positions spaced a predetermined number of pixels from each other in each of the main scanning direction and sub-scanning direction and the sensor pixel rows can be arranged with longitudinal directions of the sensor pixel rows in the main scanning direction, and they may have easy-to-manufacture shapes, such as shapes separated by straight lines.

REFERENCE SIGNS LIST 100, 200 image reading device, 110, 210 line sensor, 111a, 111b, 111c, 211a, 211b, 211c first sensor pixel row, 112a, 112b, 112c, 212a, 212b, 212c second sensor pixel row, 213a, 213b, 213c sensor chip, 120 signal reader, 130 image corrector, 140 image obtaining unit, 150, 250 image processor, 151 sub displacement correction amount setter, 152 image memory, 153 sub-scanning direction position corrector, 154 main overlap processing amount setter, 155, 255 image data separator, 156, 256 interpolation image data generator, 156a overlap region image data extractor, 156b main scanning direction position corrector, 156c overlap region image data processor, 157 image connector.

The invention claimed is:

1. An image reading device comprising:
a line sensor including at least one set including two first imaging element rows and a second imaging element row, the two first imaging element rows each including a plurality of imaging elements that are arranged in a main scanning direction and obtain electrical signals of pixels in the main scanning direction, the two first imaging element rows being arranged with a first interval therebetween in the main scanning direction, the second imaging element row including a plurality of imaging elements that are arranged in the main scanning direction and at least obtain one or more electrical signals of one or more pixels included in the first interval, the two first imaging element rows and the second imaging element row being arranged with a second interval therebetween in a sub-scanning direction that is a direction perpendicular to the main scanning direction; and
processing circuitry
to obtain, from electrical signals obtained by scanning an original in the sub-scanning direction with the two first imaging element rows, two first read image data items including pixel data items of pixels corresponding to the respective two first imaging element rows,
to obtain, from electrical signals obtained by scanning the original in the sub-scanning direction with the second imaging element row, a second read image data item including pixel data items of pixels corresponding to the second imaging element row, and
to generate a line image data item in which the one or more pixels in the first interval are not vacant, by incorporating one or more pixel data items of the one or more pixels included in the first interval out of the second read image data item into the two first read image data items, wherein
the plurality of imaging elements of the second imaging element row include imaging elements arranged outside the first interval in the main scanning direction so that the plurality of imaging elements of the second imaging element row are capable of obtaining electrical signals of pixels outside both ends of the first interval in the main scanning direction, and
the processing circuitry is configured
to temporarily store a single-line data item that is pixel data items corresponding to a single line in the main scanning direction of each of the two first read image data items,
to generate two sub corrected image data items in which a displacement in the sub-scanning direction generated due to the second interval between each of the two first read image data items and the second read image data item has been corrected from each of the two first read image data items, by reading the temporarily stored single-line data items in accordance with a time at which the processing circuitry obtains pixel data items of a corresponding single line of the second read image data item,
to set main scanning direction overlap processing amounts by selecting overlap amounts in the main scanning direction of the first imaging element rows,
to separate, from the second read image data item, a non-overlapping image data item that is the one or more pixel data items of the one or more pixels included in the first interval, on a basis of the main scanning direction overlap processing amounts,
to generate two main corrected image data items from the two sub corrected image data items by correcting a positional displacement in the main scanning direction between each of the two sub corrected image data items and the second read image data item by shifting positions of one or more pixels included in each of the two sub corrected image data items, in the main scanning direction in decimal fraction units,
to generate two interpolation image data items by adjusting, in each of the two main corrected image data items, one or more pixel data items of one or more overlap pixels that are one or more pixels overlapping the second read image data item in the main scanning direction, between the main corrected image data item and the second read image data item, and
to generate the line image data item by connecting the two interpolation image data items and the non-overlapping image data item.

2. An image reading device comprising:
a line sensor including at least one set including two first imaging element rows and a second imaging element row, the two first imaging element rows each including a plurality of imaging elements that are arranged in a main scanning direction and obtain electrical signals of pixels in the main scanning direction, the two first imaging element rows being arranged with a first interval therebetween in the main scanning direction, the second imaging element row including a plurality of imaging elements that are arranged in the main scanning direction and at least obtain one or more electrical signals of one or more pixels included in the first interval, the two first imaging element rows and the second imaging element row being arranged with a second interval therebetween in a sub-scanning direction that is a direction perpendicular to the main scanning direction; and processing circuitry to obtain, from electrical signals obtained by scanning an original in the sub-scanning direction with the two first imaging element rows, two first read image data items including pixel data items of pixels corresponding to the respective two first imaging element rows, to obtain, from electrical signals obtained by scanning the original in the sub-scanning direction with the second imaging element row, a second read image data item including pixel data items of pixels corresponding to the second imaging element row, and to generate a line image data item in which the one or more pixels in the first interval are not vacant, by incorporating one or more pixel data items of the one or more pixels included in the first interval out of the second read image data item into the two first read image data items, wherein the plurality of imaging elements of the second imaging element row include imaging elements arranged outside the first interval in the main scanning direction so that the plurality of imaging elements of the second imaging element row are capable of obtaining electrical signals of pixels outside both ends of the first interval in the main scanning direction, and the processing circuitry is configured to temporarily store a single-line data item that is pixel data items corresponding to a single line in the main scanning direction of each of the two first read image data items, to generate two sub corrected image data items in which a displacement in the sub-scanning direction generated due to the second interval between each of the two first read image data items and the second read image data item has been corrected from each of the two first read image data items, by reading the temporarily stored single-line data items in accordance with a time at which the processing circuitry obtains pixel data items of a corresponding single line of the second read image data item, to separate, from the second read image data item, a non-overlapping image data item that is the one or more pixel data items of the one or more pixels included in the first interval, to generate two interpolation image data items by adjusting, in each of the two sub corrected image data items, one or more pixel data items of one or more overlap pixels that are one or more pixels overlapping the second read image data item in the main scanning direction, between the sub corrected image data item and the second read image data item, and to generate the line image data item by connecting the two interpolation image data items and the non-overlapping image data item.

3. An image reading method comprising:

obtaining two first read image data items from electrical signals obtained by scanning an original with two first imaging element rows in a sub-scanning direction that is a direction perpendicular to a main scanning direction, the two first imaging element rows each including a plurality of imaging elements that are arranged in the main scanning direction and obtain electrical signals of pixels in the main scanning direction, the two first imaging element rows being arranged with a first interval therebetween in the main scanning direction, the two first read image data items including pixel data items of pixels corresponding to the respective two first imaging element rows;

obtaining a second read image data item from electrical signals obtained by scanning the original with a second imaging element row in the sub-scanning direction, the second imaging element row including a plurality of imaging elements that are arranged in the main scanning direction and at least obtain one or more electrical signals of one or more pixels included in the first interval, the two first imaging element rows and the second imaging element row being arranged with a second interval therebetween in the sub-scanning direction, the second read image data item including pixel data items of pixels corresponding to the second imaging element row; and generating a line image data item in which the one or more pixels in the first interval are not vacant, by incorporating one or more pixel data items of the one or more pixels included in the first interval out of the second read image data item into the two first read image data items, wherein the plurality of imaging elements of the second imaging element row include imaging elements arranged outside the first interval in the main scanning direction so that the plurality of imaging elements of the second imaging element row are capable of obtaining electrical signals of pixels outside both ends of the first interval in the main scanning direction, and the generating the line image data item includes:

temporarily storing a single-line data item that is pixel data items corresponding to a single line in the main scanning direction of each of the two first read image data items;

generating two sub corrected image data items in which a displacement in the sub-scanning direction generated due to the second interval between each of the two first read image data items and the second read image data item has been corrected from each of the two first read image data items, by reading the temporarily stored single-line data items in accordance with a time of obtaining pixel data items of a corresponding single line of the second read image data item;

setting main scanning direction overlap processing amounts by selecting overlap amounts in the main scanning direction of the first imaging element rows;

separating, from the second read image data item, a non-overlapping image data item that is the one or more pixel data items of the one or more pixels included in the first interval, on a basis of the main scanning direction overlap processing amounts;

generating two main corrected image data items from the two sub corrected image data items by correcting a positional displacement in the main scanning direction between each of the two sub corrected image data items and the second read image data item by shifting positions of one or more pixels included in each of the two sub corrected image data items, in the main scanning direction in decimal fraction units;

generating two interpolation image data items by adjusting, in each of the two main corrected image data items, one or more pixel data items of one or more overlap pixels that are one or more pixels overlapping the second read image data item in the main scanning direction, between the main corrected image data item and the second read image data item; and generating the line image data item by connecting the two interpolation image data items and the non-overlapping image data item.

\* \* \* \* \*